United States Patent
Hester et al.

(10) Patent No.: US 7,512,943 B2
(45) Date of Patent: Mar. 31, 2009

(54) DISTRIBUTED CACHING OF FILES IN A NETWORK

(75) Inventors: Anna M. Hester, Redmond, WA (US); Barbara Harder, Kirkland, WA (US); Edward F. Reus, Woodinville, WA (US); Jeffrey S. Roberts, North Bend, WA (US); Kancheng Cao, Bothell, WA (US); Mike Zoran, Redmond, WA (US); Narayana Mahankali, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 236 days.

(21) Appl. No.: 11/215,621

(22) Filed: Aug. 30, 2005

(65) Prior Publication Data

US 2007/0050761 A1 Mar. 1, 2007

(51) Int. Cl.
*G06F 9/445* (2006.01)

(52) U.S. Cl. .................. 717/177; 717/172; 709/217; 709/219; 709/220; 709/223; 709/227; 707/9; 707/10

(58) Field of Classification Search ......... 709/201–203, 709/229, 220, 223, 226, 227, 217, 219; 717/171–173, 717/176–178; 707/9, 10
See application file for complete search history.

(56) References Cited

U.S. PATENT DOCUMENTS

| | | | | |
|---|---|---|---|---|
| 6,374,289 | B2 * | 4/2002 | Delaney et al. | 709/203 |
| 6,983,326 | B1 * | 1/2006 | Vigue et al. | 709/229 |
| 7,003,514 | B2 * | 2/2006 | Dutta et al. | 707/5 |
| 7,035,911 | B2 * | 4/2006 | Lowery et al. | 709/217 |
| 7,117,264 | B2 * | 10/2006 | Becker et al. | 709/227 |
| 2002/0147771 | A1 * | 10/2002 | Traversat et al. | 709/203 |
| 2003/0009570 | A1 * | 1/2003 | Moskowitz et al. | 709/229 |
| 2003/0041141 | A1 * | 2/2003 | Abdelaziz et al. | 709/223 |
| 2003/0131129 | A1 | 7/2003 | Becker et al. | |
| 2003/0233455 | A1 * | 12/2003 | Leber et al. | 709/226 |
| 2005/0076092 | A1 * | 4/2005 | Chang et al. | 709/217 |
| 2005/0105476 | A1 * | 5/2005 | Gotesdyner et al. | 370/254 |
| 2005/0120133 | A1 * | 6/2005 | Slack-Smith | 709/234 |
| 2005/0259607 | A1 * | 11/2005 | Xiong et al. | 370/328 |
| 2006/0212542 | A1 * | 9/2006 | Fang et al. | 709/219 |

OTHER PUBLICATIONS

Aruto Crespo and Hector Garcia-Molina, "Routing Indices for Peer-to-Peer Systems", 2002, 22nd International Conference on Distributed Computing Systems, pp. 23-32.*

Mark Jelasity and Maarten van Steen, "Large Scale Newscast Computing on the Internet", Oct. 2002, Vrije Universiteit, Amsterdam, Department of Computer Science, Internal report IR-503. retrieved from: www.cs.vu.nl/pub/papers/globe/IR-503.02.pdf.*

(Continued)

*Primary Examiner*—Lewis A Bullock, Jr.
*Assistant Examiner*—Jue S Wang
(74) *Attorney, Agent, or Firm*—Workman Nydegger

(57) ABSTRACT

Distributed caching and download of file. A method is described that includes building a peer list comprising a listing of potential peer servers from among one or more networked computers. The peer list includes no more than a predetermined number of potential peer servers. Potential peer servers in the peer list are queried for a file or portion of a file. A message from a peer server in the peer list is received indicating that the peer server has the file or portion of a file available for download. The computer system downloads the file or portion of a file from the peer server.

12 Claims, 3 Drawing Sheets

OTHER PUBLICATIONS

Mark Jelasity, Alberto Montressor, and Ozalp Babaoglu, "A Modular Paradigm for Building Self-Organizing Peer-to-Peer Applications", 2003, Proc. of the 1st International Workshop on Engineering Self-Organizing Applications (ESOA'03), retrieved from: http://citeseer.ist.psu.edu/jelasity03modular.html.*

Chonggang Wong and Bo Li, "Peer-to-Peer Overlay Networks: A Survey", Apr. 20, 2003, Department of Computer Science, The Hong Kong University of Science and Technology, retrieved from: http://lumumba.uhasselt.be/~stofke/thesis/papers/15.pdf.*

Eli Brosh and Yuval Shavitt, "Approximation and Huristic Algorithms for Minimum-Delay Application-Layer Multicast Trees", Mar. 2004, INFOCOM 2004, Twenty-third AnnualJoint Conference of the IEEE Computer and Communications Societies, pp. 2697-2707.*

Pearlman et al., "Elective Participation in Ad Hoc Networks Based on Energy Consumption", 2002, Global Telecommunications Conference, 2002. GLOBECOM '02. IEEE, vol. 1, p. 26-31.*

Ramanathan et al., "Finding Good Peers in Peer-to-Peer Networks", 2002, Proceedings of the International Parallel and Distributed Processing Symposium (IPDPS'02).*

BitTorrent, "BitTorrent Protocol Specification v1.0", Sep. 2004, retrieved from: http://web.archive.org/web/20040924233054/http://wiki.theory.org/BitTorrentSpecification.*

Legout et al., "Understanding BitTorrent: An Experimental Perspective", Jul. 8, 2005, I.N.R.I.A. Technical Report.*

Beatty, John, et al., Web Services Dynamic Discovery (WS-Discovery), 42 pages, Apr. 2005.

Handley, M., et al., "Multicast-Scope Zone Announcement Protocol (MZAP)", Network Working Group, http://www.ietf.org/rfc/rfc2776.txt, Section 6.4, RFC 2776, Feb. 2000, 26 pages.

Kermode, Rodger, et al., "Support for Reliable Sessions with a Large Number of Members", http://research.microsoft.com/users/dthaler/sadp.ps Section 4.2, Networked Group Communication, First International COST264 Workshop (NGC'99) Pisa, Italy, Nov. 17-20, 1999.

Handley, Mark, "Session Directories and Scalable Internet Multicast Address Allocation", http://portal.acm.org/ft_gateway.cfm?id=285269&type=pdf&coll=GUIDE&d1=GUIDE&CFID=33872392&CFTOKEN=55082998 Proceedings of ACM SIGCOMM, pp. 105-116, 1998.

Brosh, Eli, et al., "Approximation and Heuristic Algorithms for Minimum Delay Application-Layer Multicast Trees", INFOCOM 2004, Twenty-third Annual Joint Conference of the IEEE Computer and Communication Societies, Mar. 2004.

Jelasity, Mark, et al., "A Modular Paradigm for Building Self-Organizing Peer-to-Peer Applications", Proc. of the 1st International Workshop on Engineering Self-Organizing Applications (ESOA'03).

Wang, et al., "Peer-to-Peer Overlay Networks: A Survey", Department of Computer Science, The Hong Kong University of Science and Technology, Apr. 2003.

* cited by examiner

DISTRIBUTED CACHING OF FILES IN A NETWORK

BACKGROUND

Network computing allows computers to request and receive software and file content from servers for installation and/or storage on the computers. File content may include, for example, text files, video files, data files, image files, etc. The software can be requested and downloaded for several purposes including updating system software, updating application software, and updating data files. For example, security patches may be downloaded for updating an operating system to prevent or counteract attacks on a computer system. Additionally, software can be downloaded for installing new applications on a computer. In one exemplary system, software can be downloaded in the background such that the software may be downloaded while a computer and computer user perform other tasks. One exemplary service with this functionality is the Background Intelligent Transfer Service (BITS).

Often, when software is published and available for download from a server, there are many computers on the network that attempt to obtain the software simultaneously or within a very short period of time. For example, when the software is a security patch, there is a desire to deliver the software to as many computers as possible in as short of time as possible to prevent malicious attacks on the computers or the network. When the software is a new application intended for system wide distribution in a corporate campus, there may be a desire to deploy the software system wide in a short period of time. When the software is a highly anticipated release, a large number of users may attempt to download the software in an effort to be among the first to use the software. To distribute the software on a large scale may require large amounts of server and network capacity. Such large scale downloads may be especially troublesome in a network environment where a number of branch offices connect to an enterprise hub at corporate headquarters. In this example, when software is distributed from the enterprise hub, the network connection between the enterprise hub and a branch office may limit the number of computers that can be updated at a particular time even when a server at the enterprise hub has sufficient capabilities for providing software to many or all of the computers at the branch office.

There are several methods that have been used to distribute the workload for large scale downloads. For example, in a corporate environment, deploying new software may be accomplished by only deploying the software to a limited number of computers on the network at a given time. Alternatively, caching proxies may be placed within the network to distribute the software to a subset of the computers on the network. Both of these solutions require careful planning to be implemented. In addition, in the case of caching proxies, additional computer hardware is added to the network increasing the cost of the network.

While various issues have been identified in this background, the subject matter claimed below does not necessarily address any or all of the identified issues. This background serves simply to provide background on one exemplary environment where the embodiments described herein may be practiced.

SUMMARY

One embodiment described herein includes a method of caching and sharing files. The method may be practiced for example at a computer system in a computer network including one or more networked computers. The method includes building a peer list including a listing of potential peer servers from among the one or more networked computers. The peer list includes no more than a predetermined number of potential peer servers. Potential peer servers in the peer list are queried for a file or portion of a file. A message from a peer server in the peer list is received indicating that the peer server has the file or portion of a file available for download. The computer system downloads the file or portion of a file from the peer server.

Another embodiment described herein includes a method of caching and sharing files. The method may be practiced for example at a computer system in a computer network including one or more networked computers. The method includes sending a message that the computer system is available as a peer. The computer system receives a request to discover if the computer system has a file or portion of a file. The computer system sends a message that the computer system has the file or portion of a file. Sending the message that the computer system has the file or portion of a file is performed based on dynamic opt-in/opt-out rules. The computer system receives a request to download the file. The computer system sends the file to a requesting system.

Another embodiment described herein includes a method of caching and sharing files. The method may be practiced for example at a computer system in a computer network including one or more networked computers. The computer system sends a broadcast signal to computer systems on a subnet to discover potential peers. The computer system receives a unicast, or alternatively a multicast signal from one of the computer systems on the subnet. The computer system adds the one of the computer systems on the subnet to a peer list. The peer list includes no more than a predetermined number of peers. The computer system sends a unicast signal to the one of the computer systems on the subnet to discover if the one of the system has a file or portion of a file available for download. The computer system receives a unicast signal from the one of the computer systems on the subnet indicating that the one of the computer systems on the subnet has the file or portion of a file available for download. The computer system downloads the file or portion of a file from the one of the computer systems on the subnet.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

In order that the manner in which the above-recited and other features are obtained, a more particular description will be rendered by reference to specific embodiments which are illustrated in the appended drawings. Understanding that these drawings depict only typical embodiments and are not therefore to be considered limiting of scope, the embodiments will be described and explained with additional specificity and detail through the use of the accompanying drawings in which.

DETAILED DESCRIPTION

One embodiment described herein includes an improved file distribution system that allows for file distribution to be moved away from a centralized file server. In this example, file distribution and caching is moved to the edges of the network. This helps to reduce the load on centralized file servers and to distribute network traffic across a network as opposed to having the network traffic concentrated at a few centralized network connections. Specifically, in one embodiment computers cache and share files using a peer to peer system. A computer system will first build a peer list including a list of potential peer servers from among one or more networked computers. In this embodiment, the peer list is limited to a predetermined number of peers. The system may then authenticate the peers in the peer list. A system can then query peers from the list of peers to find peers that contain a file or portion of a file needed by the computer system. If one of the peers in the peer list responds indicating that it has the file or portion of a file available, the file or portion of a file may be downloaded from the peer so indicating. If no peers respond indicating that they have the file or portion of a file, the system requesting the file can download the file from a central file server and then may indicate to other computer systems that it has the file or portion of a file available for download. In response to indicating that it has the file or portion of a file available for download, other computer systems can add the computer system to their peer list that includes their list of potential peer servers as will be described in more detail below. Notably, other peer systems may add the querying computer system to their peer list in response to the query to find peers that contain a file or portion of a file.

Computer systems, in one exemplary embodiment, can create peer groups from computers that are not interconnected by a central enterprise server or hub. For example, peer groups may be formed at branch offices of an enterprise network, at computers on a common hub or router, to eliminate peer connections across expensive connections such as cable modem connections, and the like. In this way, smaller amounts of network traffic and server resources are needed to distribute files to a peer group where files may be cached and downloaded. In this fashion, processing and network capabilities required for distributing software and updates is moved from a centralized location in a network to the edges of the network so as to more evenly distribute computing and network requirements.

Figure 1:
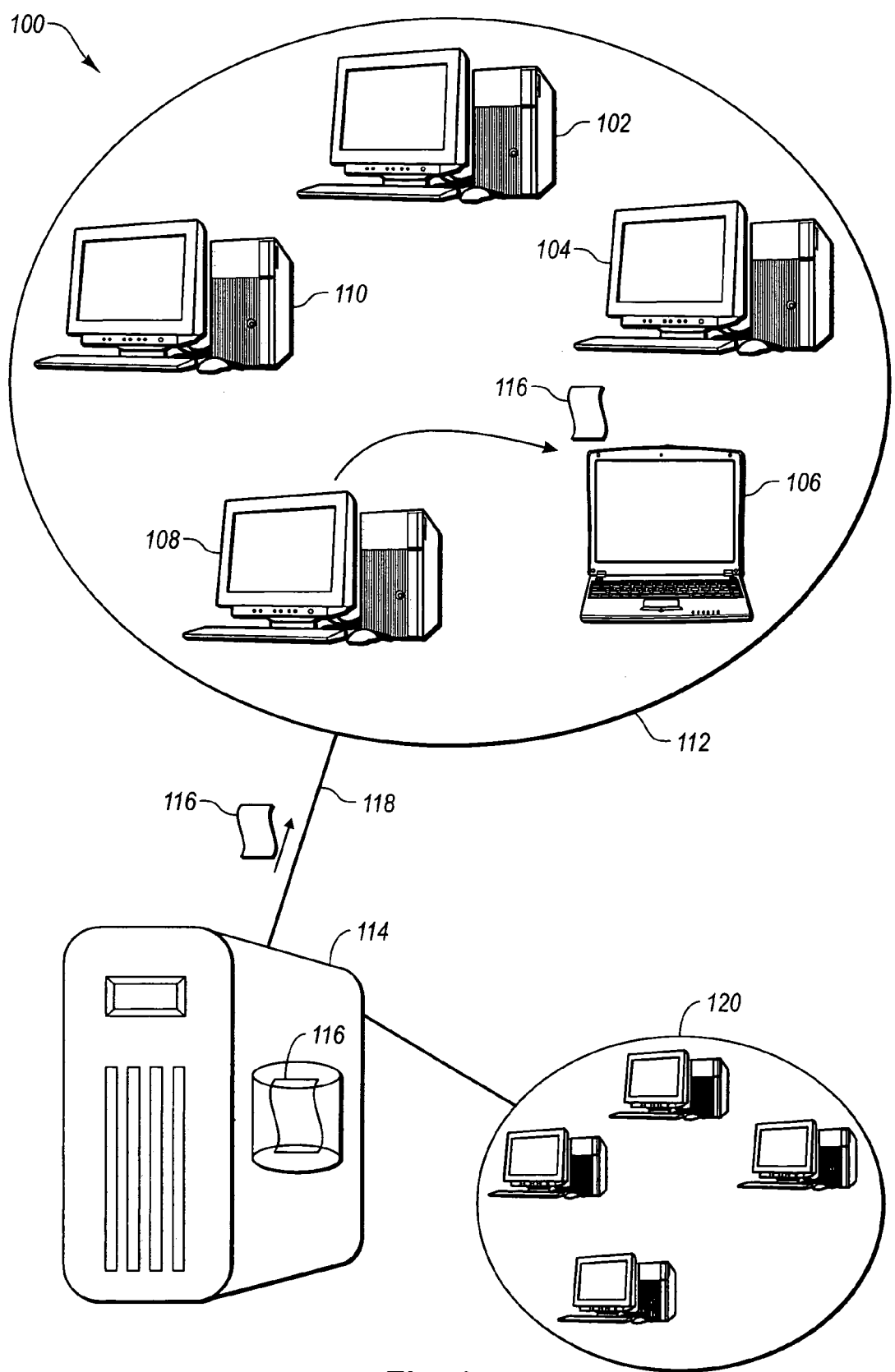
FIG. 1 illustrates a block diagram of an example network.

Referring now to FIG. 1, an exemplary topology 100 is illustrated. The topology 100 includes a number of computer systems 102, 104, 106, 108, 110. The computer systems 102-110 are interconnected through any one of a number of interconnection means. For example, the computer systems 102-110 may be interconnected through network connections such as Ethernet networks complying with IEEE 802.3, wireless Ethernet connections such as those complying with IEEE 802.11, Blue-Tooth wireless networks, dial up networking connections, cable modem connections, and the like. In the embodiment shown, the computer systems 102-110 are interconnected to form a peer group 112. In this example, the peer group 112 is one group of potential peer servers for a computer system such as the laptop computer system 106. In one embodiment, each computer system maintains a peer list that includes a listing of potential peers servers from which a computer system can download a file. Formation of the peer group will be discussed in more detail below.

FIG. 1 further illustrates that the peer group 112 is connected to a central file server 114. While the connection to the central file server 114 is shown as a single connection, in alternative embodiments, various connections may be used such that each of the computers 102-110 may have access to the central file server 114 or in other configurations. For example, the peer group may be connected in a branch office of a corporate enterprise, where the branch office connects to the central file server 114 which is at an enterprise hub. Various other interconnections may also be implemented.

In the example shown, the file server may store a file 116 or portion of a file. The file 116 may be for example, a software update, a security patch for an operating system, an application, a data file, or other software. The file 116 may be downloaded by or pushed to one of the computers such as computer system 108. The computer system 108 can then act as a potential peer server with a cached copy of the file 116. Other computer systems 102, 104, 106, 110 can then request the file 116 from the potential peer server system 108. In this fashion, network traffic along the connection 118 between the file server and the peer group 112 may be reduced in some embodiments. Further, processing by the central file server 114 may be reduced.

As mentioned previously, FIG. 1 illustrates that one of the computer systems is a laptop computer system 106 and that the peer group 112 is in a list of potential peer servers maintained by the laptop computer system 106. Laptop computers, and other portable computers including hand-held devices, pdas, cell-phones, and the like, by their very nature are portable and may find themselves in physically and logically different portions of a network. The laptop computer 106 may be for example moved to a location either logically or physically where it is not practical for the laptop computer 106 to download files from the peer group 112. For example, the laptop computer 106 may be moved logically into a different subnet than the peer group 112. Alternatively, the laptop computer 106 may be moved physically to a location that requires an inordinate amount of network traffic for the laptop computer 106 to communicate with other members of the peer group 112. In the embodiment shown in FIG. 1, the laptop computer 106 creates another peer group such as the peer group 120 shown in FIG. 1. The laptop 106 may maintain information about the first peer group 112 and the second peer group 120 such that the laptop 106 may receive files when it is connected in the first peer group 112 or the second peer group 120 or any other peer group which the laptop 106 has a peer list.

When a computer system in the peer group 112 receives the file 116, the computer system should determine that the file is the correct file and is not corrupted. Determining that the file is the correct file and not corrupted can be accomplished for example by comparing file names, file sizes, hash values, etc. For example, a computer system may have received information about the file including file name, file size, and a hash value of the file. Hash values are values calculated using the data in the file to generate a value in such a way that it is extremely unlikely that some other data will produce the same hash value. The computer system can determine that the correct file is being received by comparing the file name, file size and/or hash value. In addition, the hash value may be used to ensure that the file has not been corrupted or maliciously altered.

If a computer system detects that the correct file is not available, that the file has been corrupted, or that the file has been maliciously altered, the computer system can then request the file 116 directly from the central file server 114. A computer system directly requesting the file 116 from the central file server 114 may then advertise itself as a potential storage system containing the file 116.

Notably, in one embodiment, the peer group, as described above is maintained and specific for each computer system. Thus, peer group management is moved from a central location using a system without central control. This eliminates single point failure point for the entire network. Stated differently, the loss of one peer list or one system with a peer list will not disable the entire system of file distribution and caching such as may occur when a single centralized server is used to manage peer groups.

Figure 2:
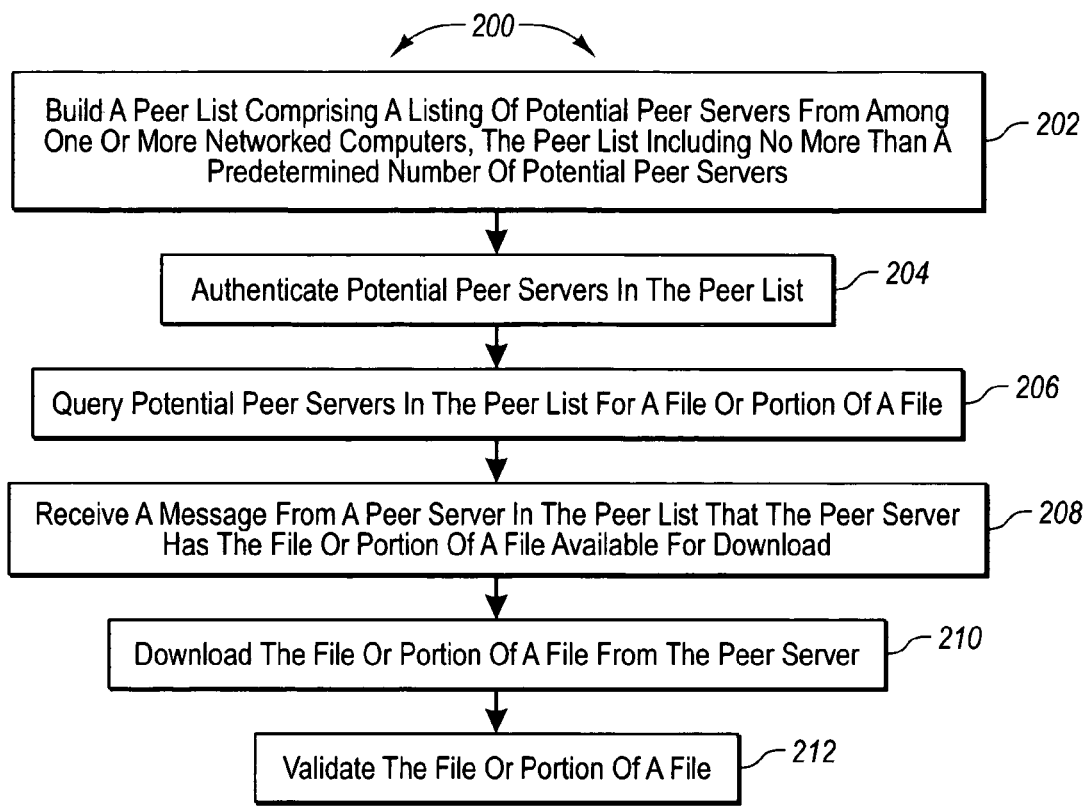
FIG. 2 illustrates a flow-chart illustrating a method for caching and sharing files from a client perspective.

Referring now to FIG. 2, a method 200 of caching and sharing files is illustrated. The method may be performed at a computer system that is on a computer network that includes one or more networked computers.

FIG. 2 illustrates an act of building a peer list (act 202). The peer list includes a listing of potential peer servers from among a group of networked computers such as the computer systems 102-110 illustrated in FIG. 1. The peer list may be such that it includes no more than a predetermined number of potential peer servers. For example, the peer list may be designed such that no more than 100 potential peer servers are included in the peer list. Further, it is also desirable that the computer systems 102-110 in a peer group be near-by from a networking perspective. For example, it may be desirable that the computer systems 102-110 in the peer group 112 be located at the same branch office of an enterprise network. In an alternative embodiment, it may be desirable that the computer systems 102-110 in a peer group 112 be located on a common hub, router, or switch. In some alternative embodiments it may be desirable that none of the peers are interconnected to each other through expensive connections such as those between cable modems or high traffic connections. Other logically near-by configurations may also be implemented. For example, in one embodiment, the computer system may use a timing method to determine the nearness of computers. There are several methods that may be used alone or in combination to build a peer list (202). Examples of these methods will now be discussed herein below.

One method of building a peer list (202) involves sending a solicitation request and receiving replies from computers. To limit the number of potential peers responding, the solicitation request may be for example a subnet broadcast or multicast to get replies for a single subnet. However, even if only computers on a single subnet respond, the number of responses could still be overwhelming. Thus, to further limit the number of responses, a computer system sending a solicitation request may include in the solicitation request an indication of the number of peers desired. Potential peers may be configured to respond using multicast replies after a random short interval and to listen for multicast replies by other computers. A potential peer will not respond if it has detected responses from the other potential peers already meets the indication of the number of peers desired. In other words, a potential peer will not reply if the number of peers desired have already replied.

Several methods may be used to generate the random short interval. For example, in the simplest embodiment, a uniform random distribution may be used by each potential peer to determine how long to wait before replying to the solicitation. An alternative method includes using a non-linear distribution where fewer potential peers respond in the beginning and more respond as the delay get longer. For example, one method of integrating the non-linear delay may include generating a random number between 0 and 1. The delay may then be defined by the following equation:

DELAY=MAX_DELAY*Log(C*X+1)/Log(C+1)

Where DELAY is the delay before responding, MAX_DELAY is the maximum amount of time given for receiving responses, X is the random number, and C is an arbitrary number such as 256. Other non-linear random delays may also be used.

In another example, systems may respond without a delay, and a computer system may add peers to a peer list until it has enough peers to fill the peer list. In this example, the peers responding most quickly may be those logically closest to the computer system sending the solicitation request. In this example, a computer system can time potential peers to see how quickly they respond to the solicitation. Only the fastest responding potential peers will be added to the peer list. Thus, a computer system may be able to select the peers best suited for a peer group by accepting those that are logically closest or able to respond most quickly.

The solicitation request may also include a group such as a trust group. Potential peers will ignore requests related to other trust groups. Even when trust groups are used in the solicitation request, there may still be a need to authenticate a peer as described in more detail below. The trust group serves as a method of weeding out replies from other trust groups within the same subnet so that overlapping solicitations within a subnet do not interfere with each other. In one embodiment, the solicitation request may include an identification of content desired by the computer system. As described below potential peers reply if they have the content in the identification and satisfy other opt-in constraints. This makes the content lookup more efficient because a single content request reaches all potential hosts. This embodiment may be less private because unauthenticated hosts can see which content is being requested. Requesting a one-way hash of the URL, or a content hash, may be used to enhance privacy in this embodiment.

In another example, building a peer list may include a computer system receiving a self-announcement with a multicast packet from a potential peer. The self-announcement includes an indication that the potential peer has files or portions of files that can be served to computers on the network. When such an announcement is received, the computer system may add the potential peer to its peer list. The self-announcements may be made, in one alternative embodiment on a regular basis. In one example, the announcement may be made once an hour, or several times during a day.

Computer systems may self-announce when they have files to share and when their hardware characteristics, current processing load, or other characteristics allow them to act as a peer server. The announcing computer systems may receive the files 116 from the central file server 114 or from another peer in the peer group 112. Computer systems may have certain files for which they will not self-announce. This allows the computer systems to protect certain files.

In an alternative embodiment, a potential peer may announce when it has been added to a network such as through a multicast. A computer can then add this new computer to its peer list if there is a need for peers in the peer list. In a similar vein, a computer system can add peers to a peer list when it receives other types of multicast announcements and replies. For example, a computer system listening for replies related to the random time delay response embodiment above may add any computer systems that reply to the original solicitation to its peer list. Likewise, nearly any reply or announcement can be used to determine what computers are available as potential peers for a peer list.

Computers in the peer list may be either validated or unvalidated. Validated computer systems are those that have passed an authentication as outlined below. Peers in the peer list do not need to be validated immediately after being added to the peer list, but rather, they can be validated at a time proximate to querying peers in the peer list for a file or portion of a file (act 206) discussed in more detail below. However, once a peer in the peer list has been validated, the computer system and the peer can share a key such that the validation does not need to be performed for subsequent file queries.

Part of the process of building a peer list may include updating the peer list to remove outdated entries or to remove entries that are no longer valid. For example, a computer system may remove entries from the peer list after the entries have been in the peer list for a predetermined period of time. This ensures that stale entries have a limited lifespan. In another alternative embodiment, peer entries may be removed in response to a multicast issued by a peer when the peer leaves a network. For example, a "Bye" multicast one-way message is sent as a best effort notification to other peers when a peer is preparing to leave a network. When this "Bye" message is detected by a computer system, the peer sending the "Bye" message may be removed from the peer list. "Bye" messages may be less preferred because a malicious computer could use "bye" requests to cause other computers to be removed from peer lists and thus cause more computers to make requests to the central file server. In another example, peers may be removed from the peer list when an attempt is made to query the peer for files and an error is received indicating that the peer is no longer on the network. In one embodiment, a computer system may discard all entries in an entire peer list when a number of queries to different peers in the peer list result in error messages. This may be an indication that the portion of the network that the computer system is trying to access is not available any longer. In another embodiment, a peer may be removed from a peer list if it fails validation. This will be discussed in more detail below, but in short, when a peer fails validation, it is an indication that the peer is not to be trusted. In a similar vein, a peer may be removed from a peer list if files received from the peer fail certain security checks such as hash comparisons. This too will be discussed in more detail below.

When a sufficient number of peers have been removed from the peer list, the acts for building a peer list described above may be repeated. Notably, the acts described above can be used alone or in combination.

Computer systems may maintain more than one peer list. For example, in FIG. 1, an example of a laptop computer system 106 is illustrated. As explained, the laptop computer system 106 may be physically and or logically relocated. In one embodiment, the laptop computer 106 may be relocated logically such that it resides on a different subnet than the first peer group 112. The laptop computer system 106 may detect that it has moved to a new subnet, and in response to detecting that it has moved into a new subnet, the laptop computer system 106 may perform the acts described above for building a peer list to build a new peer list for the new subnet. If the laptop computer system 106 regularly is a member of certain subnets, it may maintain the peer list for those subnets so as to avoid the need to perform the acts for building a peer list each time it connects to the subnets. The number of different peer lists that a computer system maintains may be a statically defined number, or alternatively the number may be a user or network administrator configurable number.

Notably, there may be situations where a computer system moves to a new subnet, but does not form a new peer group. For example, if a laptop computer moves to an Internet café, it will likely not form a new peer group. Communication with available peers may be too risky for this and other situations.

Computer systems may also be configured to build a peer list when they are first added to a network. This can be done by any new computer system and is not limited to laptop systems.

Referring once again to FIG. 2, an act of authenticating computers in the peer list (act 204) is shown. Authenticating includes validating that a peer is a trusted machine. In one embodiment, a computer system may validate that a peer is a member of a specific security group. Validation can be performed, for example, by using a protocol such that both the computer system and the peer perform a mutual-authentication. In this way, the identity of both the computer system and the peer are validated to prevent either the computer system or the peer from the peer list from "spoofing" the other into believing that they are in the same security group. One protocol for this mutual authentication may be Kerberos. If a peer fails validation, the peer may be removed from the peer list.

Once a peer has been validated, the computer system and the peer can share a key such that subsequent validations do not need to be performed prior to subsequent queries. The key may have an expiration period to make the trust validation efficient. Such an expiration period may be in one example, one day.

Once a peer has been validated, FIG. 2 further illustrates an act of querying peers in the peer list for a file or portion of a file (act 204). Querying the peers in the peer list, in one exemplary embodiment includes sending unicast messages to each of the peers in the peer list until one of the peers responds that it has the file or portion of a file sought by the computer system. Note that as used herein, a unicast is a network query to a specific computer. Unicasts described herein do not necessarily require the use of a datagram protocol, and may use other protocols such as TCP and others. In one alternative embodiment, the computer system may send an overlapped set of unicast messages. For example, the computer system may send unicast messages to peers in the peer list before receiving replies from peers previously sent unicast messages.

The message sent in the act of querying may include various parameters to identify the file needed by the computer system. For example, the message may include one or more of a file name, file size, file creation date, and/or a hash of the file. In particular, by using a hash of the file, a system can detect that the correct file is available. Using a hash, a computer system may be able to detect when an available file is the updated file, not a duplicate name of another file, and the like.

After a computer system has queried peers in the peer list for a file or portion of a file (act 206), the method illustrated in FIG. 2 shows an act of receiving a message from a peer server in the peer list that the peer server has the file or portion of a file available for download (act 208).

When deciding if a peer will act as a peer server, the peer may reference various policy rules. Additionally, even when a peer has a file available, that peer may choose not to act as a peer server in accordance with the policy rules. Such policy rules may take into account the processing power of the computer system. For example, a powerful desktop or server class computer may have policy rules that allow it to act as a peer server to more peers and say for example a laptop computer such as the laptop computer system 106. Other rules may relate to the amount of machine resources available. For example, policy rules may restrict a computer systems ability to act as a peer server when more than 10% of the computer systems resources are being used. The system resources may be a measure of the greater of CPU load and disk I/O load on the system. Additionally, a laptop computer may reference a policy that adjust the number of peers that the laptop computers system 106 may act as a peer server to be based on the operating state of the laptop computer system 106. For example, when the laptop computer system 106 is connected to a docking station, it may be configured to serve more peers than when not connected to a docking station. Further, when the laptop computer system 106 is connected via a wired connection, it may be allowed to serve more peers than when the laptop computer system 106 is connected in a wireless fashion to the peer computers. In yet another example, the number of peers allowed to connect to the laptop computer system 106 may be defined by a policy related to battery level. For example if the laptop is running on batteries and has less than 50% power than the laptop computer system 106 may follow a policy that disallows any further peer computer connections.

When a peer has determined to act as a peer server, the peer server sends a message back to the computer system, which is received (act 208) by the computer system.

After a computer system has received a message from a potential peer server in the peer list indicating that the potential peer server has the file or portion of a file available for download, the computer system downloads the file or portion of a file (act 210). Downloading may occur in any appropriate way. Notably, as alluded to herein, a computer system may download a portion of a file as opposed to the entire file. Other portions of the file may be obtained from other peer servers. In some environments, this can help to increase the rate at which large files may be downloaded.

In one embodiment, the method 200 further includes validating the file or portion of a file (act 212). Validation verifies that the file is the correct file, that the file has not been maliciously altered, and/or that the file has not been corrupted. This may be accomplished, for example, by calculating a hash of the file or portion of a file. If the calculated hash value does not match the expected hash value, the computer system will discard the file or portion of a file. Additionally the computer system may place the peer server that served the file on a quarantine list indicating that the peer server is suspect. In an alternative embodiment, the peer server may be removed from the peer list altogether. The computer system can then attempt to get the file from a different peer in the peer list or from a central file server. The computer system may also notify the peer server that served the file that there is a problem with the file. This will allow the peer server to discard the file. Other computer systems may also be notified of the suspect nature of the file.

Figure 3:
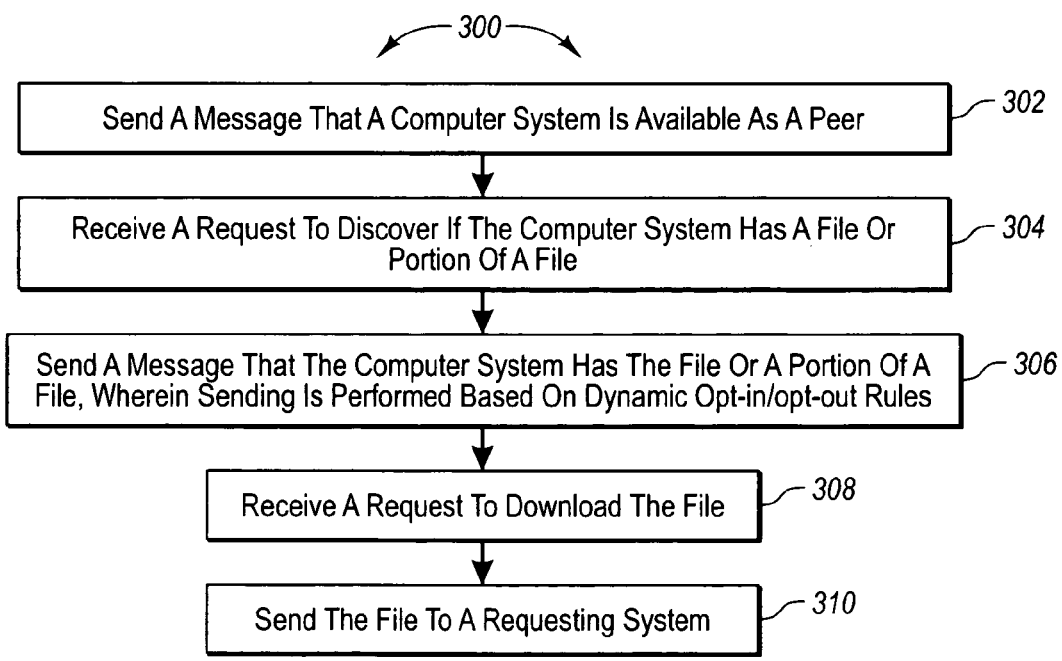
FIG. 3 illustrates a flow-chart illustrating a method for caching and sharing files from a peer server perspective.

Referring now to FIG. 3, an embodiment is illustrated showing a method 300 of caching and sharing files from the perspective of a potential peer server. The method illustrated at FIG. 3 may be practiced at a computer system in a network, where the network includes one or more networked computers.

The method 300 includes an act of sending a message that the computer system is available as a peer (act 302). Sending a message that the computer system is available as a peer (act 302) may be performed using a multicast on a subnet when the computer system has files to share. In an alternative embodiment, sending a message that a computer system is available as a peer may be performed using a multicast or unicast in response to receiving a solicitation request from a system looking for peer computers. When sending a message that the computer system is available as a peer (act 302) is performed in response to receiving a solicitation request, the computer system may respond by using a random delay using the procedure described above in conjunction with the description of FIG. 2.

The method 300 further includes an act of receiving a request to discover if the computer system has a file or portion of a file (act 304). The received message may be a unicast request from a system that has the computer system in a peer list. In alternative embodiments, the request may be an overlapping unicast as described above. Multicast requests may also be used when security is not required for the file.

The method 300 further includes an act of sending a message that the computer system has the file or portion of a file (act 304). Sending a message that the computer system has the file or portion of a file (act 304) is performed based on dynamic opt-in/opt-out rules. For example in one embodiment policy rules may take into account the processing power of the computer system. A powerful desktop or server class computer may have policy rules that allow it to act as a peer server to more peers than other less powerful systems. Other rules may relate to the amount of machine resources available. For example, policy rules may restrict a computer systems ability to act as a peer server when more than 10% of the computer systems resources are being used. The system resources may be a measure of the greater of CPU load and disk I/O load on the system. In an alternative embodiment related to laptop computers, a laptop computer may reference a policy that adjust the number of peers that the laptop computers system 106 may act as a peer server to based on the operating state of the laptop computer system 106. For example, when the laptop computer system 106 is connected to a docking station, it may be configured to serve more peers than when not connected to a docking station. Further, when the laptop computer system 106 is connected via a wired connection, it may be allowed to serve more peers than when the laptop computer system 106 is connected in a wireless fashion to the peer computers. In yet another alternative embodiment, the number of peers allowed to connect to the laptop computer system 106 may be defined by a policy related to battery level. For example if the laptop is running on batteries and has less than 50% power than the laptop computer system 106 may follow a policy that disallows any further peer computer connections.

The method 300 further includes an act of receiving a request to download the file (act 308). The method 300 further includes an act of sending the file to a requesting system (310). These may be performed by the computer system acting as a peer server to other systems on a network.

Figure 4:
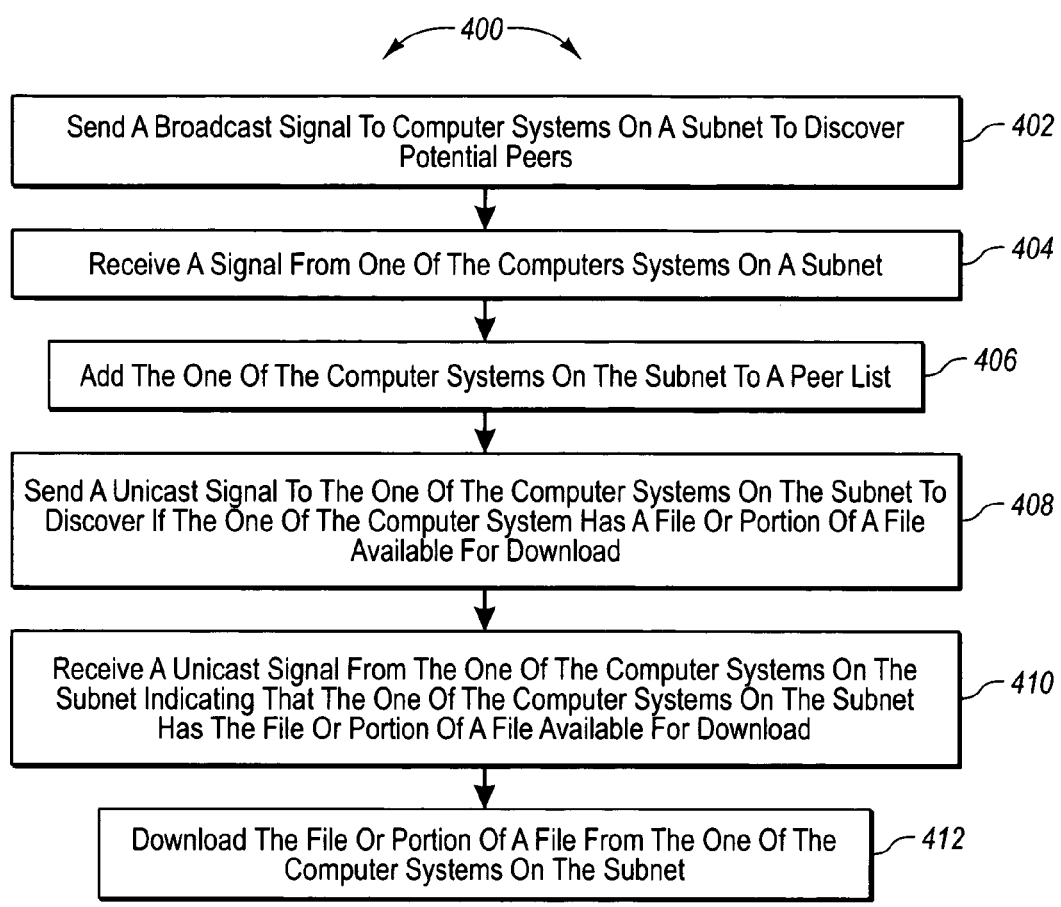
FIG. 4 illustrates a flow-chart illustrating a method for discovering peers and downloading a file or portion of a file.

Referring now to FIG. 4, an embodiment is illustrated showing a method 400 of caching and sharing files which includes various messaging formats. The method illustrated at FIG. 4 may be practiced at a computer system in a network, where the network includes one or more networked computers.

The method includes an act of the computer system sending a broadcast signal to computer systems on a subnet to discover potential peers (act 402). The broadcast signal may indicate a desire for a predetermined number of responses. In an alternative embodiment, the broadcast may include various parameters to allow the computer system to evaluate any responses to the broadcast signal. For example, the parameters may allow for timing of response, evaluation of hardware characteristics of responding systems and the like.

The computer system will then receive a signal from one of the computers systems on a subnet (act 404). This signal may include a listing of files that can be served, characteristics of the system sending the signal, etc. The signal may be a multicast signal, or in some cases, a unicast signal.

The computer system will add the one of the computer systems on the subnet to a peer list (act 406). The peer list includes no more than a predetermined number of peers. For example, the peer list may include no more than 100 peers. This allows the computer system to limit the amount of processing and network usage needed to find a file or portion of a file for download.

The computer system sends a unicast signal to the one of the computer systems on the subnet to discover if the one of the computer system has a file or portion of a file available for download (act 408). The computer system may repeat this process with other computer systems to discover where a file or portion of a file may be located. Notably, the unicast signals may overlap such that unicasts may occur simultaneously from the same computer system.

The computer system receives a unicast signal from the one of the computer systems on the subnet indicating that the one of the computer systems on the subnet has the file or portion of a file available for download (act 410).

The computer system can then download the file or portion of a file from the one of the computer systems on the subnet (act 412).

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

Although the subject matter has been described in language specific to structural features and/or methodological acts, it is to be understood that the subject matter define in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. At a computer system in a computer network including one or more networked computers a method of caching and sharing files, the method comprising acts of:

building a peer list comprising a listing of potential peer servers from among the one or more networked computers, the peer list including no more than a predetermined number of potential peer servers, wherein building a peer list comprises:

(a) sending a solicitation request to one or more potential peers including an indication of a number of peers desired;

(b) receiving message replies from potential peers, wherein the potential peers wait for a random interval of time, while listening for multicast replies from other potential peers, and wherein the potential peers detect responses from the other potential peers and determine the number of responses from other potential peers and only send replies if the potential peers have not detected the number of responses corresponding to the number of peers desired, from other potential peers, and do not send replies if they have detected the number of responses from other potential peers indicated in the number of peers desired;

(c) based on messages received from potential peers, adding potential peers that sent replies as potential servers to the peer list up to the predetermined number based on messages received from the one or more networked computers, and wherein potential servers are added to the peer list according to logical closeness of the potential servers to the computer system;

(d) removing potential servers from the peer list; and (e) repeating acts (a-c) when a predetermined number of potential servers have been removed from the peer list;

querying potential peer servers in the peer list for a file or portion of a file;

receiving a message from a peer server in the peer list that the peer server has the file or portion of a file available for download; and downloading the file or portion of a file from the peer server.

2. The method of claim 1, wherein the potential peers that wait for a random short interval of time use a logarithmic random delay calculated as DELAY=MAX_DELAY* Log (c*X+1)/Log(C+1), where DELAY is the delay before responding, MAX_DELAY is the maximum amount of time given for receiving responses, X is a random number, and C is an arbitrary number, to determine the amount of time to wait before replying.

3. The method of claim 1, wherein sending and receiving are done with computers on the same first subnet.

4. The method of claim 3, further comprising building a second peer list by disconnecting from the first subnet, connecting to a second subnet, sending a solicitation request; and receiving replies from computers on the second subnet.

5. The method of claim 1, wherein building a peer list comprises acts of:
receiving a self-announcement with a multicast packet from a potential peer, wherein the self-announcement includes an indication that the potential peer has files that can be served to computers on the network; and
adding the potential peer to the peer list.

6. The method of claim 1, wherein the solicitation request includes identification of a trust group.

7. The method of claim 1, further comprising an act of determining that the file or portion of a file is corrupt and in response to determining that the file or portion of a file is corrupt downloading the file or portion of a file from a central server.

8. The method of claim 7, wherein determining that the file or portion of a file is corrupt comprises an act of referencing a hash value.

9. The method of claim 1, further comprising an act of determining that the file or portion of a file is not available from any of the computers in the peer list and in response to determining that the file or portion of a file is not available from any of the computers in the peer list, downloading the file or portion of a file from a central server.

10. The method of claim 1, further comprising authenticating computers in the peer list prior to querying computers in the peer list for a file or a portion of a file.

11. At a first computer system in a computer network including one or more networked computer systems a method of caching and sharing files, the method comprising acts of:
receiving a solicitation request, the solicitation request being sent to one or more potential peers and including an indication of a number of peers desired;
waiting for a random interval of time, while listening for multicast replies from other potential peers, and detecting responses from other potential peers to determine the number of responses from other potential peers and only sending replies to the solicitation request if the number of responses corresponding to the number of peers desired have not been detected, and not sending replies if the number of responses from other potential peers indicated in the number of peers desired have been detected;
detecting after the expiration of the random interval of time that the number of responses corresponding to the number of peers desired have not been detected, and as a result, sending a message to one or more computer systems on a same subnet as the first computer system that the first computer system is available as a peer;
as a result of sending a message to one or more computer systems on a same subnet as the first computer system that the first computer system is available as a peer, receiving a request from a requesting system to discover if the first computer system has a file or portion of a file;
in response to the request to discover if the first computer system has a file or portion of a file, sending a message to the requesting system that the first computer system has the file or portion of a file;
as a result of sending a message that the first computer system has the file or portion of a file, receiving a request from the requesting system to download the file; and
in response to receiving a request to download the file sending the file to the requesting system.

12. At a computer system in a computer network including one or more networked computers a method of caching and sharing files, the method comprising acts of:
(a) sending a broadcast signal to computer systems on a subnet to discover potential peers, the broadcast signal including an indication of a number of peers desired;
(b) receiving a reply signal from one of the computer systems on the subnet wherein the one of the computer systems waits for a random interval of time, while listening for multicast replies from other potential peers, and wherein the one of the computer systems detects responses from the other potential peers and determines the number of responses from other potential peers and only sends the reply signal if the one of the computer systems has not detected the number of responses from other potential peers corresponding to the number of peers desired, and does not send a reply signal if it has detected the number of responses from other potential peers indicated in the number of peers desired;
(c) selectively adding the one of the computer systems on the subnet to a peer list based on the logical closeness of the one of the computer systems, wherein the peer list comprises no more than a predetermined number of peers;
(d) removing peers from the peer list;
(e) selectively adding peers to the peer list when a predetermined number of peers have been removed from the peer list;
sending a unicast signal to the one of the computer systems on the subnet to discover if the one of the computer system has a file or portion of a file available for download;
receiving a unicast signal from the one of the computer systems on the subnet indicating that the one of the computer systems on the subnet has the file or portion of a file available for download; and
downloading the file or portion of a file from the one of the computer systems on the subnet.

* * * * *